United States Patent
Chen (10) Patent No.: US 9,086,734 B2
(45) Date of Patent: Jul. 21, 2015

(54) DOUBLE PRE-LOADED DEFLECTION WEBS FOR KEYPAD

(71) Applicant: BLACKBERRY LIMITED, Waterloo (CA)

(72) Inventor: Chao Chen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 115 days.

(21) Appl. No.: 13/969,109

(22) Filed: Aug. 16, 2013

(65) Prior Publication Data

US 2015/0049024 A1 Feb. 19, 2015

(51) Int. Cl.
G06F 3/02 (2006.01)
G09G 5/00 (2006.01)

(52) U.S. Cl.
CPC .................................. *G06F 3/0202* (2013.01)

(58) Field of Classification Search
None
See application file for complete search history.

(56) References Cited

U.S. PATENT DOCUMENTS

| 4,315,114 | A | 2/1982 | Monti, Jr. |
|---|---|---|---|
| 7,126,498 | B2 | 10/2006 | Levy |
| 7,391,861 | B2 | 6/2008 | Levy |
| 7,623,118 | B2 | 11/2009 | Skillman |
| 7,880,727 | B2 | 2/2011 | Abanami et al. |
| 8,446,264 | B2 | 5/2013 | Tanase |
| 2007/0115263 | A1 | 5/2007 | Taylor et al. |
| 2007/0165368 | A1 | 7/2007 | Hsu et al. |
| 2010/0148995 | A1 | 6/2010 | Elias |
| 2012/0006667 | A1* | 1/2012 | Chen et al. ............ 200/5 B |
| 2012/0112933 | A1* | 5/2012 | Chen ........................ 341/27 |
| 2013/0063286 | A1 | 3/2013 | Elias et al. |
| 2013/0063356 | A1 | 3/2013 | Martisauskas |

FOREIGN PATENT DOCUMENTS

CA 2410454 A1 12/2001

OTHER PUBLICATIONS

ISR/WO issued in PCT/CA2014/050780 on Sep. 18, 2014; 8 pages.
Chen, Chao; U.S. Appl. No. 13/969,127, filed Aug. 13, 2013; Title: Double Pre-Loaded Deflection Webs for Keypad; 24 pages.
PCT International Search Report; Application No. PCT/CA2014/050783; Nov. 14, 2014; 3 pages.
PCT Written Opinion of the International Searching Authority; Application No. PCT/CA2014/050783; Nov. 14, 2014; 4 pages.
Office Action dated Apr. 10, 2015; U.S. Appl. No. 13/969,127 filed Aug. 16, 2013; 19 pages.

* cited by examiner

*Primary Examiner* — Nicholas Lee
(74) *Attorney, Agent, or Firm* — Conley Rose, P.C.; J. Robert Brown, Jr.

(57) ABSTRACT

A keypad for an electronic device is provided and includes a substrate comprising an array of dome elements, an array of frets, an array of mechanical keys disposed in rows interleaved between the frets, a first deflection web supportively disposed adjacent to the substrate and a second deflection web disposed between the frets and the keys and the first deflection web. The substrate is configured to pre-load the first and second deflection webs toward the keys.

20 Claims, 7 Drawing Sheets

DOUBLE PRE-LOADED DEFLECTION WEBS FOR KEYPAD

BACKGROUND

Aspects of the invention are directed to handheld electronic devices and, more particularly, to handheld electronic devices including double pre-loaded deflection webs for integrated keypad modules.

Numerous types of handheld electronic devices are presently in use. Exemplary handheld electronic devices include personal data assistants (PDAs), handheld computers, two-way pagers and cellular telephones. Many feature wireless communication capability and/or are stand-alone devices that are functional without communication with other devices.

Handheld electronic devices are generally intended to be portable, with many being small enough to fit within a pocket, a belt holster, a briefcase or a purse. As the form factor of such devices has shrunk for improved portability, so has the size of components such as keyboards or keypads. The keyboards or keypads include keys that act as switches for input entry when actuated. In order to further the miniaturization of these components, one general approach has involved the use of an electrical key in the form of a resilient dome-shaped element that is electrically conductive and is disposed on a circuit board.

In simplest form, such a dome element is a smooth sector of a hollow sphere. When an actuation force is applied to the apex of the dome element, the dome element collapses to thereby complete an electrical circuit. The collapsing dome element provides a tactile feedback to the user of the handheld electronic device. Such simple sphere segments have been generally effective for their intended purpose but often the tactile feedback is not noticeable.

Thus, the dome elements are often provided with elastomeric or compliant layers that provide for an improved tactile feel or increase the tactile feel of the dome element. However, due to the small size of the various components, it has been difficult to produce the elastomeric or compliant layers such that they fit with the keys and the other structural elements of the keyboards or keypads. This leads to elastomeric or compliant layers that are too small, which leads to moisture ingress that can damage the underlying components.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
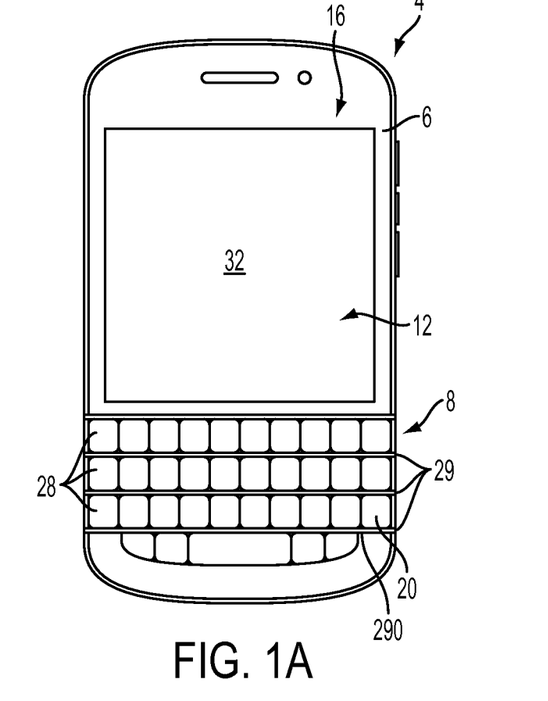
FIG. 1A is a front view of an electronic device.

With reference to FIGS. 1A, 1B, 2 and 3, an electronic device 4 is provided. As shown in FIG. 1A, the electronic device 4 may be a handheld electronic device (e.g., a portable phone, a smart phone, a mobile computing device, etc.) and includes a housing 6, an input apparatus 8, an output apparatus 12 and a processor 16, which is disposed on or in the housing 6. The input apparatus 8 provides input to the processor 16 and the processor 16 provides output signals to the output apparatus 12.

The input apparatus 8 may include a keypad 20 that serves as a navigation input. The keypad 20 includes a plurality of keys 28 that are each actuatable to provide input to the processor 16 and a plurality of frets 29. The plurality of keys 28 may be arranged in multiple rows of keys 28 that are interleaved with the frets 29. The frets 29 may individually extend as single monolithic elements across a front of the housing 6. The keypad 20 can further function as an optical pad, a track pad, capacitive input or a track ball to provide navigational and other input to the processor 16. Thus, the keypad negates any need for separate elements to provide these functions although they still may be included in the electronic device 4. The output apparatus 12 may include a display 32, such as a liquid crystal display, LED display, e-ink display, etc., and may be covered by glass or transparent polymer.

Many of the keys 28 may have a plurality of letters, i.e., linguistic elements, assigned thereto. For instance, one of the keys 28 may represent one or more of the letters "A" and "S" while another key 28 may represent one or more of the letters "Q" and "W". The letters of the example keypad 20 may be provided in a QWERTY configuration or a reduced QWERTY configuration. Examples of other input members not expressly depicted herein would include, for instance, a mouse, a stylus pen for making menu input selections and hard buttons disposed on the housing 6, and so on.

Figure 1B:
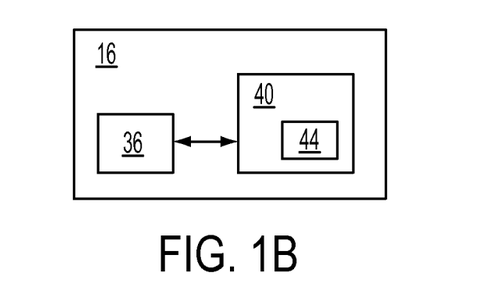
FIG. 1B is a schematic diagram of a processor of the electronic device of FIG. 1.
Figure 2:
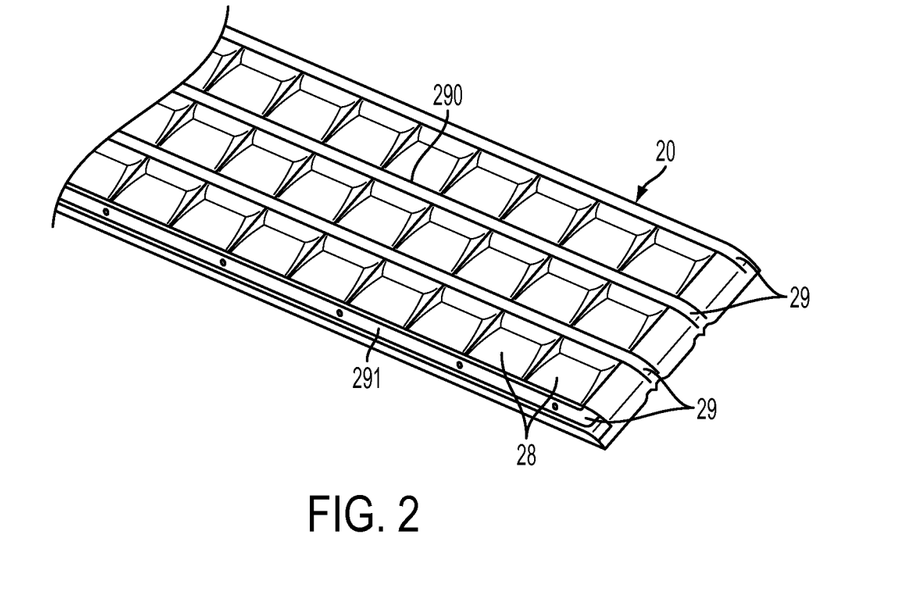
FIG. 2 is a perspective view of a keypad of the electronic device of FIG. 1.

As shown in FIG. 1B, the processor 16 includes a processing unit 36 and a memory 40. The processing unit 36 may be, for example, a microprocessor (µP) or other electronic circuitry that interfaces with the memory 40. The memory 40 can be any one or more of a variety of types of internal and/or external storage media, such as RAM, ROM, EPROM(s), EEPROM(s) and FLASH provide a storage register, i.e., a machine readable medium, for data storage. The memory 40 can be volatile memory or nonvolatile memory. The memory 40 has a number of routines 44, in the form of machine or computer readable executable instructions, which are stored therein and which are executable on the processing unit 36.

Each of the frets 29 includes an elongate body 290 having a first lateral side that faces the output apparatus 12, a second lateral side that faces away from the output apparatus 12, a bottom that is normally hidden from view and a top surface that faces the user. The elongate body 290 may have a substantially rectangular cross-section with curved or rounded edges so that the top surface presents and attractive appearance and a pleasant feel of the frets 29 so that a user can comfortably slide his fingertip along the surface of the frets 29. At side walls of the housing 6, the top surface may, but is not required to, curve away from the user so that the side walls of the housing 6 can have a pleasant feel as well. The bottom-most fret 29 may be provided as a plate 291 that matches an appearance of the housing 6.

Figure 3:
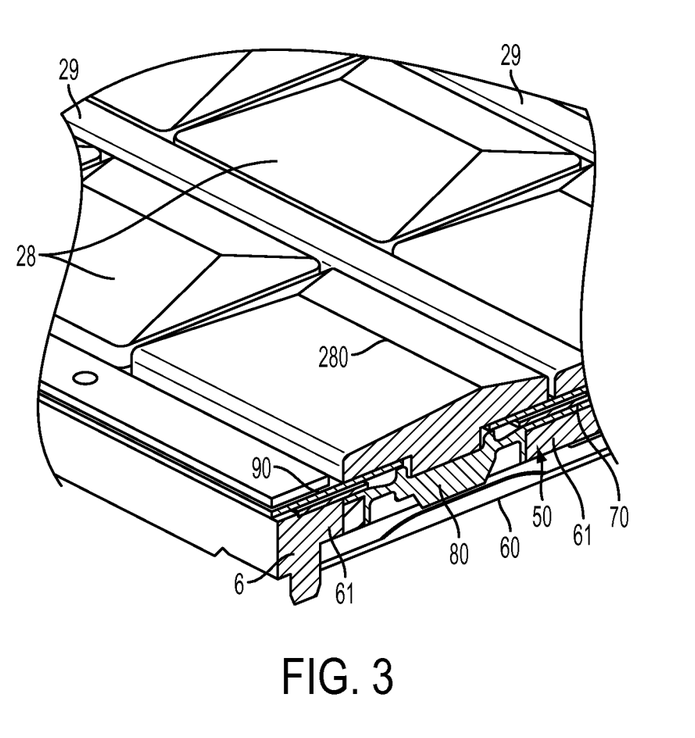
FIG. 3 is an enlarged view of a portion of the keypad of FIG. 2.

Each of the keys 28 is disposed between a pair of frets 29 with bodies 290, except for the bottom row of keys 28. The bottom row of keys 28 may be provided between a fret 29 with a body 290 and a fret 29 provided as the plate 291. The keys 28 have a length from bottom to top that is slightly less than a distance between the frets 29 and a width that is sufficient to allow each key 28 a space on the keypad 20. Most of the keys 28 are of similar size but one or more may have a larger size, such as the space bar for example. As shown in FIG. 3, each key has side walls that face complementary side walls of adjacent keys 28 or the frets 29, a bottom surface that is normally hidden from view and a top surface. The edges formed by the connection of the side walls and the top surface of each key 28 may be rounded or curved and are generally co-planar with one another and with the planes of the top surfaces of the frets 29. The top surface of each of the keys 28 is provided with angular portions that form a raised edge 280. The raised edge 280 protrudes above the plane of the top surfaces of the frets 29. The raised edge 280 may be formed to provide for a pleasant tactile feel of the keys 28.

With the keys 28 and the frets 29 configured as described above, a user may depress any of the keys 28 in a manner described below or glide a fingertip across the surface of the keypad 20 smoothly and comfortably. The raised edges 280 of the keys 28 and the flatness of the bodies 290 of the frets 29 should serve to help the user identify where on the keypad 20 the user's finger is located without requiring the user to look at the keypad 20.

As shown in FIG. 3, underlying the plurality of keys 28 and the plurality of frets 29 is a double pre-loaded web deflection structure 50. The double pre-loaded web deflection structure 50 includes a substrate 60 on which rigid elements 61 may be disposed. The rigid elements 61 may be part of a frame, e.g., a column. The rigid elements 61 may be arranged generally in line with the frets 29 and thus define a pathway for the keys 28 to travel between non-deflected and deflected positions. Due to the configuration of the double pre-loaded web deflection structure 50, the keys 28 are generally biased to assume the non-deflected position. However, at least one or more of the keys 28 can be selectively depressed toward the substrate 60 in order to affect at least one or more circuits of the electronic device 4.

A capacitive sensor layer 70 is operably interposed between the keys 28 and the frets 29 to register movement of a capacitive element, such as the user's finger, across the keys 28 and the frets 29. Thus, as noted above, the user need not depress the keys 28 in order to affect a switch of a circuit of the electronic device 4. Indeed, the user can alternatively slide his fingertip across the keypad 20 in order to enter a navigational or selective command to the processor 16. This sliding may then be translated as, for example, cursor movement in a display of the output apparatus 12.

Still referring to FIG. 3, the double pre-loaded deflection structure 50 includes a first deflection web 80 and a second deflection web 90. The first deflection web 80 is disposed between at least the keys 28 (and, in some cases, the frets 29) and the substrate 60 and is configured to provide the keys 28 with a tactile response to a deflection force sufficient to move the at least one key from the non-deflected position to the deflected position. The second deflection web 90 is disposed between the keys 28 and the first deflection web 80 and is configured to form a moisture barrier. In accordance with embodiments, the second deflection web 90 may be formed of moisture impermeable material, e.g., a polymer, rubber or similar material. The first deflection web 80 is generally harder and less compliant than the second deflection web 90, which is formed of the softer and more compliant material.

Figure 4:
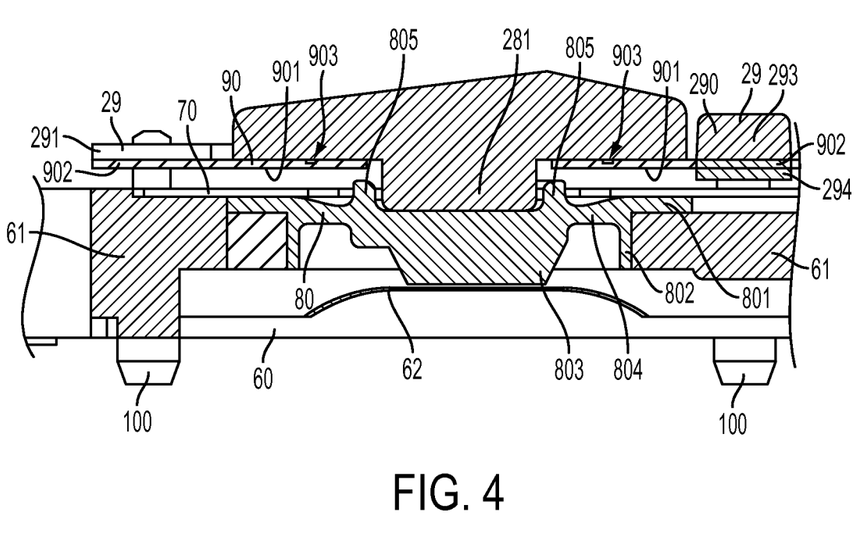
FIG. 4 is a side schematic view of double pre-loaded deflection webs at an intermediate assembly stage for a keypad in accordance with embodiments.

With reference to FIG. 4, a configuration of the double pre-loaded web deflection structure 50 and the first and second deflection webs 80 and 90 will now be described in accordance with embodiments. As shown in FIG. 4, the substrate 60 includes one or more dome elements 62 that are positionally associated with at least one or more of the keys 28, respectively. That is, the dome elements 62 may be disposed between the rigid elements 61 and the frets 29. In addition, at least one or more of the keys 28 may include a pressing element 281, e.g., a key stem, which extends downwardly from a bottom face of the corresponding key 28 in an opposite direction from the raised edge 280.

The first deflection web 80 includes lateral arms 801, vertical arms 802, pressing member 803 and webbing 804. The lateral arms 801 may be adhesively coupled to top faces of the rigid elements 61 and the vertical arms 802 may be adhesively coupled to side faces of the rigid elements 61. The webbing 804 suspends the pressing member 803 between the lateral arms 801 and the vertical arms 802 at corresponding key locations. The webbing 804 includes a narrow section that permits the webbing 804 to deflect toward and away from the corresponding dome element 62. The pressing member 803 is a monolithic element that extends vertically from the bottom-most face of the pressing element 281 of the corresponding key to the corresponding dome element 62. The pressing member 803 may further include flanges 805 that are configured to receive the bottom-most face of the pressing element 281.

Figure 7:
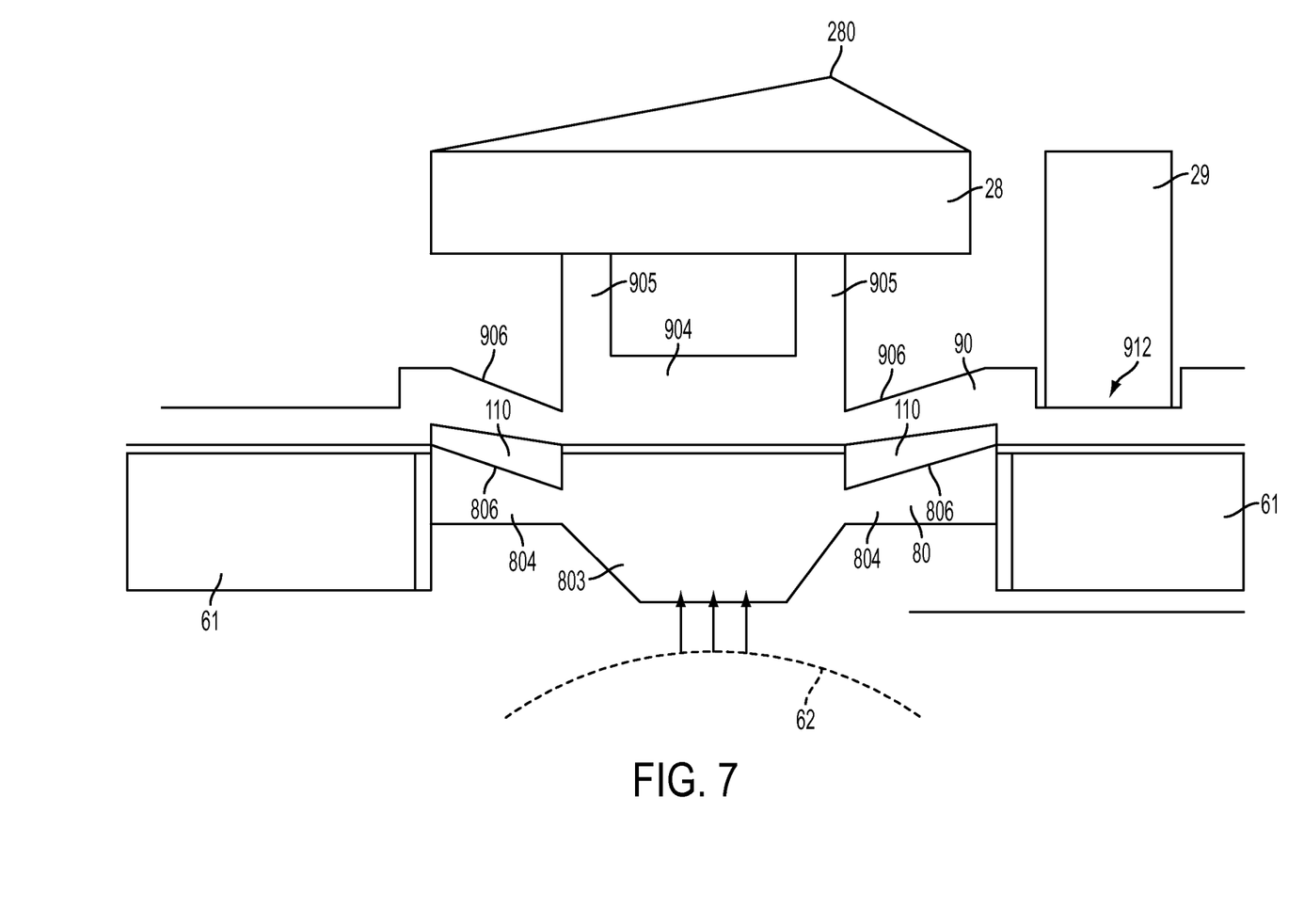
FIG. 7 is a side schematic view of double pre-loaded deflection webs for a keypad in accordance with alternative embodiments.

The second deflection web 90 extends through the frets 29 (the second deflection web may also extend around the frets 29 as in the embodiment of FIG. 7) and is provided, at least initially, as a planar element between the keys 28 and the first deflection web 80. More particularly, the second deflection web 90 includes flange portions 901 and base portions 902. The flange portions 901 are adhesively coupled to shoulder portions of the keys 28 and are formed to define surface features 903 at corresponding key locations. The adhesive used to couple the flange portions 901 to the shoulder portions of the keys may need to be contained in an area proximate to the pressing member 803 of each key 28 so that deflection of the key 28 and the second deflection web 90 is possible. The containment of the adhesive is achieved by the surface features 903 formed in the flange portions 901 or as an extension from a bottom surface of the key 28. The surface features 903 may be a recess in the surface of the flange portions 901. In particular, the surface features 903 prevent the undesirable flow of adhesive away from the pressing element 281 of each key 28. In the embodiments of FIG. 4, the base portions 902 extend almost entirely through the frets 29.

At the initial stage of assembly of FIG. 4, the keys 28 are actually not yet disposed in a non-deflected position. The first deflection web 80 is not yet pre-loaded and the second deflection web 90 is also not yet pre-loaded or deformed. This can be seen in FIG. 4 by the co-planarity of the flange portions 901 and the base portions 902 of the second deflection web 90. In order to complete the assembly, the fastening members 100 extending substantially vertically through the frets 29 are tightened in a direction oriented toward the substrate 60. This tightening causes the base portions 902 to approach and eventually contact the rigid members 61, which in turn pulls the flange portions 901 and the keys 28 downwardly.

The downward movement of the keys 28 increases a contact force between the pressing elements 281 and the pressing members 803. In accordance with embodiments, the distance covered by both the first and second deflections webs 80 and 90 due to the tightening is greater than the distance between the bottom-most surfaces of the pressing members 803 and top surfaces of the dome elements 62. Thus, the continued tightening causes the first and second deflection webs 80 and 90 to become preloaded by the dome elements 62. That is, at an end of the distance traveled by the first and second deflection webs 80 and 90 during the continued tightening, the bottom-most surface of each of the pressing members 803 contacts the top surface of each corresponding dome element 62. Additional tightening beyond this point causes the frets 29 to pre-load the first and second deflection webs 80 and 90 in a first direction, which is directed away from the keys 28 and causes the dome elements 62 to pre-load the first and second deflection webs 80 and 90 in a second direction, which is opposite the first direction and directed toward the keys 28.

Figure 5:
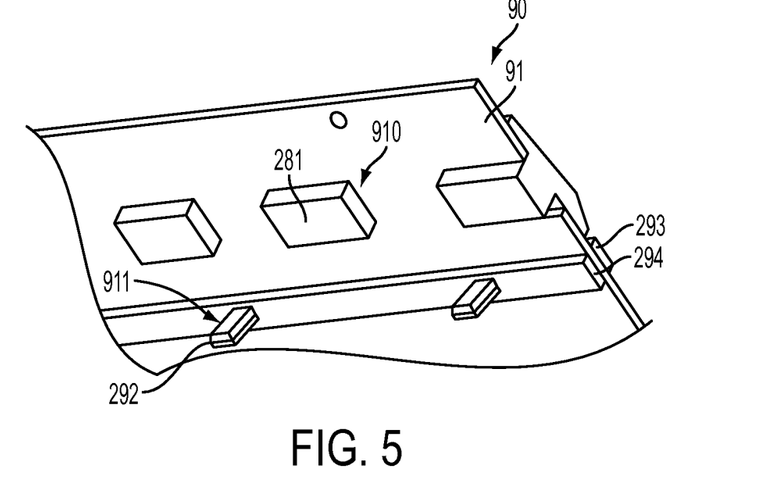
FIG. 5 is a perspective view of a single deflection web in accordance with embodiments.

With reference to FIG. 5, the second deflection web 90 may be provided as a unitary or monolithic feature with a continuous body 91. The continuous body 91 is formed to define first through-holes 910, through which the pressing elements 281 of each key 28 extend, and second through-holes 911, through which fret pins 292 extend. As shown in FIG. 5, the frets 29 include upper portions 293 and lower portions 294 that sandwich the second deflection web 90 such that, as the frets 29 are installed and assembled, the second deflection web 90 may be forced to travel toward the substrate 60 as described above.

Prior to installation and assembly, the second deflection web 90 may be provided in a flat shape and be formed of material that is relatively easy to mold, cut and adhere to other features. The second deflection web 90 is therefore relatively easy to mold, position and adhere to the keys 28 and the frets 29 and to cut where the first through-holes 910 and the second through-holes 911 are needed.

Figure 6:
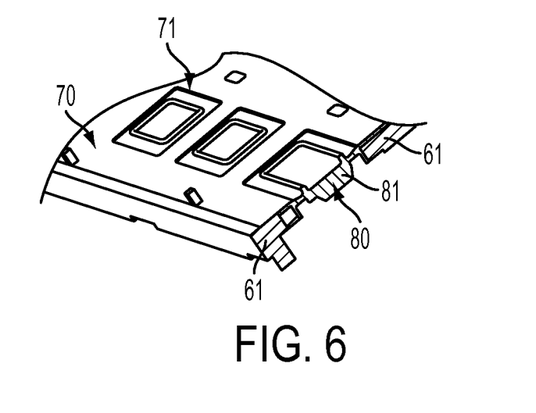
FIG. 6 is a perspective view of another single deflection web in accordance with embodiments.

With reference to FIG. 6, the capacitive sensor layer 70 may be provided as a unitary or monolithic element disposed adjacent to the first deflection web 80, which is supportively disposed on the rigid elements 61 as described above. The capacitive sensor layer 70 may be formed to define third through-holes 71 proximate to the pressing members 803 and the dome elements 62. The third through-holes 71 permit the deflection of the keys 28 and the first and second deflection webs 80 and 90 to occur without affecting a reading generated by the capacitive sensor layer 70 and without risking damage to the capacitive sensor layer 70.

The capacitive sensor layer 70 may further include sensor tails at either or both ends of the keypad 20. The sensor tails are operably coupled to the capacitive sensor layer 70 and may be configured to be coupled to the processor 16 or, more particularly, to the main printed circuit board (PCB) of the electronic device 4. In this way, capacitive signals generated by the capacitive sensor layer 70 can be transmitted to the processor 16.

As a final stage in the assembly of the double pre-loaded deflection structure 50, the keys 28 and the frets 29, the second deflection web 90 and the first deflection web 80 may be heatstaked. The heatstaking involves locally increasing the temperatures of the various features such that the first and second deflection webs 80 and 9 are bonded together and the second deflection web 90 is bonded to the keys 28 and the frets 29. The heatstaking may be achieved by inserting heatstaking pins into the double preloaded deflection structure 50 through at least the second deflection web 90 toward the first deflection web 80.

With reference to FIG. 7, an arrangement of the double pre-loaded deflection structure 50 in accordance with alternative embodiments is provided. As shown in FIG. 7, the second deflection web 90 is formed around the frets 29 as opposed to be configured to extend through then frets 29 as described above. In the embodiments of FIG. 7, the second deflection web 90 may be formed to define apertures 912 that are size to fit around the frets 29. In addition, the second deflection web 90 may include a pressing region 904 and substantially vertical arms 905 at a periphery of the pressing region 904. The substantially vertical arms 905 may be configured to attach to a bottom surface of each of the keys 28. In accordance with further embodiments, the webbing 804 of the first deflection web 80 supports the pressing member 803 and has angled surface 806 at a periphery of the pressing region 904. Similarly, the second deflection web 90 may have angled surfaces 906 at the periphery. These angled surfaces are formed to define air gaps 110 and permit the first and second deflection web 80 and 90 to be deflected and thus pre-loaded by the corresponding dome elements 62. The first and second deflection webs 80 and 90 may be adhered to one another around the air gaps 110.

Various examples are described in detail below. In accordance with an example A, a keypad 20 for an electronic device 4 is provided and includes a substrate 60 including an array of dome elements 62, an array of frets 29, an array of mechanical keys 28 disposed in rows interleaved between the frets 29, a first deflection web 80 supportively disposed adjacent to the substrate 60 and a second deflection web 90 disposed between the frets 29 and the keys 28 and the first deflection web 80, the substrate 60 being configured to pre-load the first and second deflection webs 80 and 90 toward the keys 28. In accordance with an example B, which may be combined with example A, the substrate 60 may include rigid elements 62 to which the first deflection web 80 is adhered. In accordance with an example C, which may be combined with examples A or B, the second deflection web 90 may be adhered to the first deflection web 80. In accordance with an example D, which may be combined with examples A, B or C, the second deflection web 90 extends around the frets 29. In accordance with an example E, which may be combined with examples A, B, C or D, the second deflection web 90 may extend through the frets 29. In accordance with an example F, which may be combined with examples A, B, C, D or E, the keypad 20 may further include adhesive by which the second deflection web 90 is adhered to the keys 28. In accordance with an example G, which may be combined with examples A, B, C, D, E or F, the adhesive may be proximate to a vertical member of the keys 28. In accordance with an example H, which may be combined with examples A, B, C, D, E or F, at least one of bottom surfaces of the keys 28 and the second deflection web 90 may be formed to define surface features 903 configured to contain the adhesive in a predefined region of the second deflection web 90. In accordance with an example I, which may be combined with examples A, B, C, D, E, F, G or H, the first deflection web 80 includes first deflection portions associated with the keys 28 and the second deflection web 90 includes second deflection portions associated with the keys 28. In accordance with an example J, which may be combined with examples A, B, C, D, E, F, G, H or I, the first and second deflection portions are formed to define air gaps 110. In accordance with an example K, which may be combined with examples A, B, C, D, E, F, G, H, I or J, the second deflection web 90 may be adhered to the first deflection web 80 between the air gaps 110. In accordance with an example L, which may be combined with examples A, B, C, D, E, F, G, H, I, J or K, the second deflection web 90 may be formed of material that is more compliant than a material of the first deflection web 80. In accordance with an example M, which may be combined with examples A, B, C, D, E, F, G, H, I, J, K or L, the second deflection web 90 may be formed of moisture impermeable material.

In accordance with an example N, a keypad 20 for an electronic device 4 is provided and includes a first web 80, which is deflectable at key locations, a second web 90 disposed adjacent to the first web 80, the second web 90 being deflectable at the key locations, the first and second webs 80 and 90 being pre-loaded at non-key locations in a deflection direction, and the first and second webs 80 and 90 being pre-loaded at the key locations in a direction opposite the deflection direction.

In accordance with an example O, a keypad 20 for an electronic device 4 is provided and includes a substrate 60 including an array of dome elements 62, an array of frets 29, an array of mechanical keys 28 disposed in rows interleaved between the frets 29, a first deflection web 80 supportively disposed adjacent to the substrate 60 and a second deflection web 90 disposed between the frets 29 and the keys 28 and the first deflection web 80, the frets 29 being configured to pre-load the first and second deflection webs 80 and 90 away from the keys 28, and the substrate 60 being configured to pre-load the first and second deflection webs 80 and 90 toward the keys.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically or otherwise. Other examples of changes, substitutions, and alterations are ascertainable by one skilled in the art and could be made without departing from the spirit and scope disclosed herein.

What is claimed is:

1. A keypad for an electronic device, comprising:
   a substrate comprising an array of dome elements;
   an array of frets;
   an array of mechanical keys disposed in rows interleaved between the frets;
   a first deflection web supportively disposed adjacent to the substrate; and
   a second deflection web disposed between the frets and the keys and the first deflection web,
   the substrate being configured to pre-load the first and second deflection webs toward the keys.

2. The keypad according to claim 1, wherein the substrate comprises rigid elements to which the first deflection web is adhered.

3. The keypad according to claim 1, wherein the second deflection web is adhered to the first deflection web.

4. The keypad according to claim 1, wherein the second deflection web extends around the frets.

5. The keypad according to claim 1, wherein the second deflection web extends through the frets.

6. The keypad according to claim 5, further comprising adhesive by which the second deflection web is adhered to the keys.

7. The keypad according to claim 6, wherein the adhesive is proximate to a vertical member of the keys.

8. The keypad according to claim 6, wherein at least one of bottom surfaces of the keys and the second deflection web is formed to define surface features configured to contain the adhesive in a predefined region of the second deflection web.

9. The keypad according to claim 1, wherein the first deflection web comprises first deflection portions associated with the keys and the second deflection web comprises second deflection portions associated with the keys.

10. The keypad according to claim 9, wherein the first and second deflection portions are formed to define air gaps.

11. The keypad according to claim 10, wherein the second deflection web is adhered to the first deflection web between the air gaps.

12. The keypad according to claim 1, wherein the second deflection web is formed of material that is more compliant than a material of the first deflection web.

13. The keypad according to claim 1, wherein the second deflection web is formed of moisture impermeable material.

14. A keypad for an electronic device, comprising:
   a first web, which is deflectable at key locations;
   a second web disposed adjacent to the first web, the second web being deflectable at the key locations,
   the first and second webs being pre-loaded at non-key locations in a deflection direction, and
   the first and second webs being pre-loaded at the key locations in a direction opposite the deflection direction.

15. The keypad according to claim 14, wherein the second deflection web is adhered to the first deflection web.

16. The keypad according to claim 14, wherein the first deflection web comprises first deflection portions associated with the key locations and the second deflection web comprises second deflection portions associated with the key locations.

17. The keypad according to claim 16, wherein the first and second deflection portions are formed to define air gaps.

18. The keypad according to claim 17, wherein the second deflection web is adhered to the first deflection web between the air gaps.

19. The keypad according to claim 14, wherein the second deflection web is formed of moisture impermeable material that is more compliant than a material of the first deflection web.

20. A keypad for an electronic device, comprising:
   a substrate comprising an array of dome elements;
   an array of frets;
   an array of mechanical keys disposed in rows interleaved between the frets;
   a first deflection web supportively disposed adjacent to the substrate; and
   a second deflection web disposed between the frets and the keys and the first deflection web,
   the frets being configured to pre-load the first and second deflection webs away from the keys, and
   the substrate being configured to pre-load the first and second deflection webs toward the keys.

* * * * *